United States Patent [19]

Molnar

[11] 3,797,338
[45] Mar. 19, 1974

[54] MACHINE FOR MASS PRODUCTION OF BOTH MEDIUM AND SHORT LENGTHS OF TUBING

[76] Inventor: Michael Molnar, 4381 Valley Forge Dr., Fairview Park, Ohio 44126

[22] Filed: Apr. 7, 1972

[21] Appl. No.: 241,956

[52] U.S. Cl. ............... 82/46, 82/85, 82/89, 82/101, 82/102, 83/411 R, 83/713
[51] Int. Cl. .................. B26d 7/06, B23b 5/14
[58] Field of Search ............. 82/46, 79, 83, 85, 89, 82/101, 102; 83/411 R, 713

[56] References Cited
UNITED STATES PATENTS

| | | | |
|---|---|---|---|
| 3,302,500 | 2/1967 | Hackenberger | 82/97 |
| 2,553,136 | 5/1951 | Eisler | 82/102 |
| 2,701,015 | 2/1955 | Gottschalk | 82/102 |
| 3,067,644 | 12/1962 | Dearsley | 83/402 |
| 923,552 | 6/1909 | Mill | 82/85 |
| 3,084,578 | 4/1963 | Hartford | 82/101 X |

*Primary Examiner*—Willie G. Abercrombie

[57] ABSTRACT

A versatile high-speed drum-type tube cutting machine having a series of axially spaced endless bands for rotating the tubes and holding them in parallel relation between the radial vanes of the drum and rotary knife means adjacent the drum for cutting the rotating tubes. The machine can be used to perform multiple cuts during each revolution of the drum and can also be used to effect rapid cutting of very short lengths. In the latter case the endless band means is skewed to effect axial feeding of the tubes against an adjustable stop near the end of the drum and a rotary knife is arranged to cut one short piece off the end of each tube during each revolution of the drum.

8 Claims, 11 Drawing Figures

MACHINE FOR MASS PRODUCTION OF BOTH MEDIUM AND SHORT LENGTHS OF TUBING

The present invention relates to an improved tube cutting apparatus and more particularly to a high-speed drum-type tube cutter designed for mass-production cutting of ordinary tube lengths, which cutter may be adjusted to cut very short tubes one at a time from longer lengths of tubing at high speed.

It is conventional to cut long tubes with a rotating knife while supporting the tubes on rotating mandrels. This requires axial loading and unloading of the mandrel which is usually done manually to avoid problems with bent or deformed tubes. Such a process provides a limited rate of production and is not suitable for automatic machines.

Tubes can be cut at a much higher speed using automatic drum-type tube cutters which do not require mandrels and which employ rotating endless belts to rotate the tubes and to hold them in parallel relation against the periphery of a rotating drum. However, such automatic machines do not function satisfactorily when cutting very short lengths (for example, lengths less than the outside diameter of tube).

The improved automatic tube cutting machine of the present invention is constructed to function efficiently when cutting tubes with a wide variety of lengths and diameters including those of short length and those of very small diameter. The machine includes one or more rotating knives, a rotating drum with endless bands to engage the tubes and to rotate them as they engage the knife, and means for advancing the tubes axially against a stop. The latter function may be effected by a skewed endless band, and extremely short pieces may be cut one at a time from a length of tubing by placing the rotating knife near the stop. The machine is preferably constructed so that it may be adjusted for high-speed cutting of ordinary tube lengths using a multiplicity of cutters and may also be adjusted for cutting of the shorter lengths using one cutter. The same machine may also be modified to permit cutting of tubes of extremely small diameter.

An object of the present invention is to provide a simple versatile tube cutting machine for high speed cutting of tubes of widely varying sizes.

A further object is to provide an automatic tube cutting machine which operates effectively when cutting short lengths.

Another object of the invention is to provide a high-speed automatic tube cutter which will accommodate a substantial number of rotating knives for conventional cutting and which may readily be adjusted to cut tubes of extremely short length.

Another object is to provide a reliable method of and apparatus for cutting tubes of extremely small diameter.

These and other objects, uses and advantages of the invention will become apparent to those skilled in the art from the following drawings, description and claims.

Figure 1:
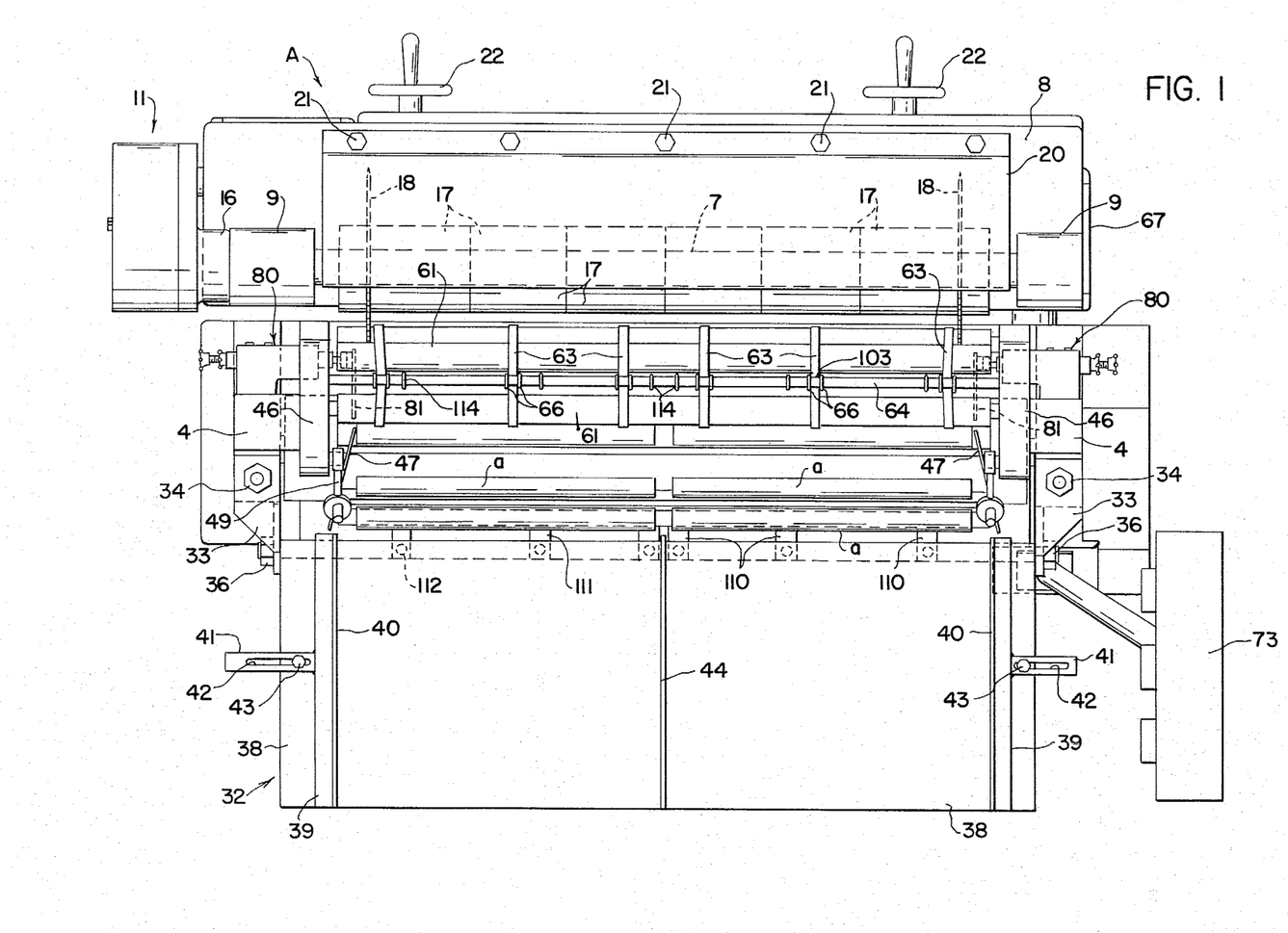
FIG. 1 is a top view of a tube cutting machine constructed according to this invention on a reduced scale.
Figure 2:
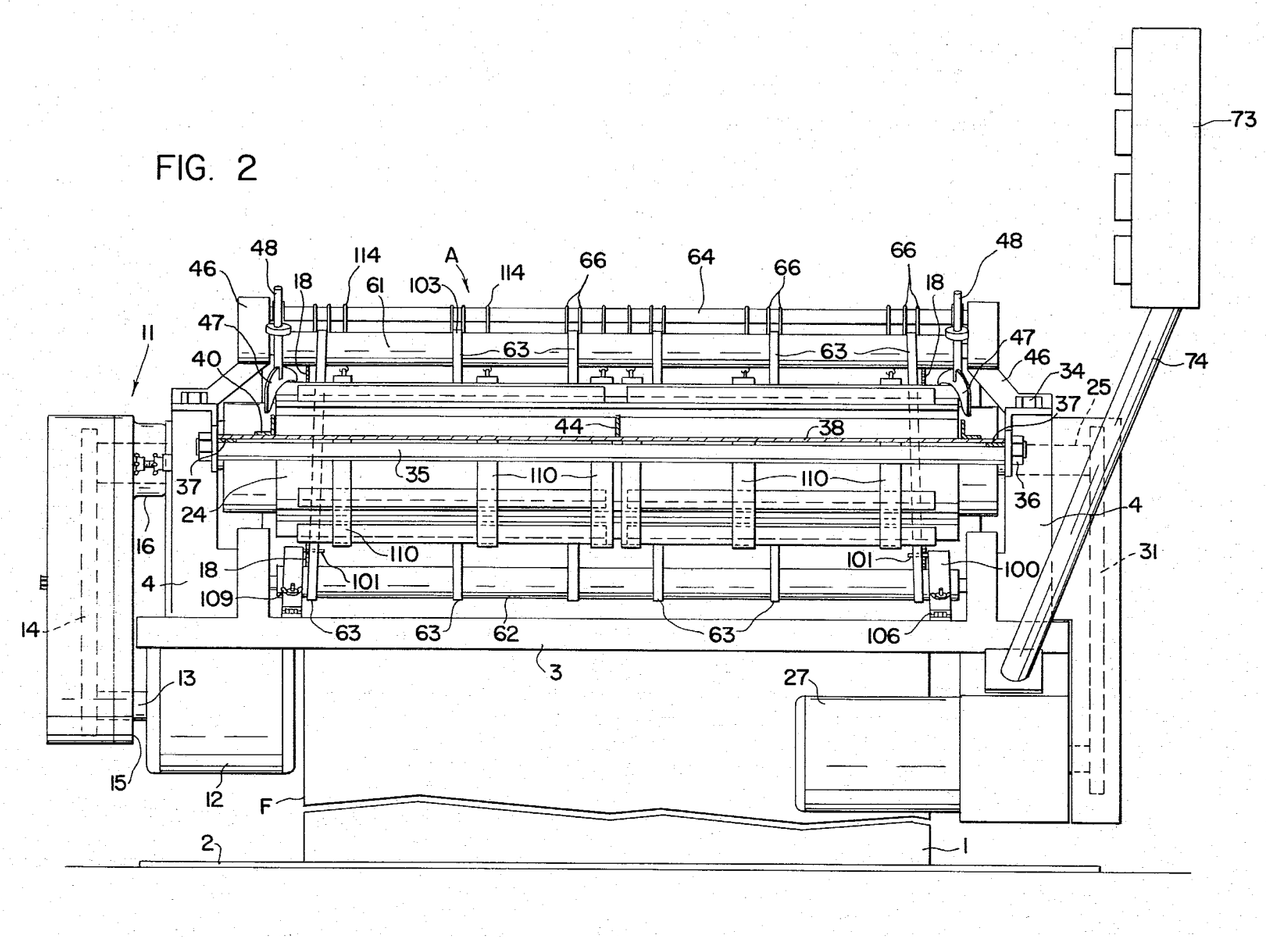
FIG. 2 is a side elevational view of the machine of FIG. 1.
Figure 3:
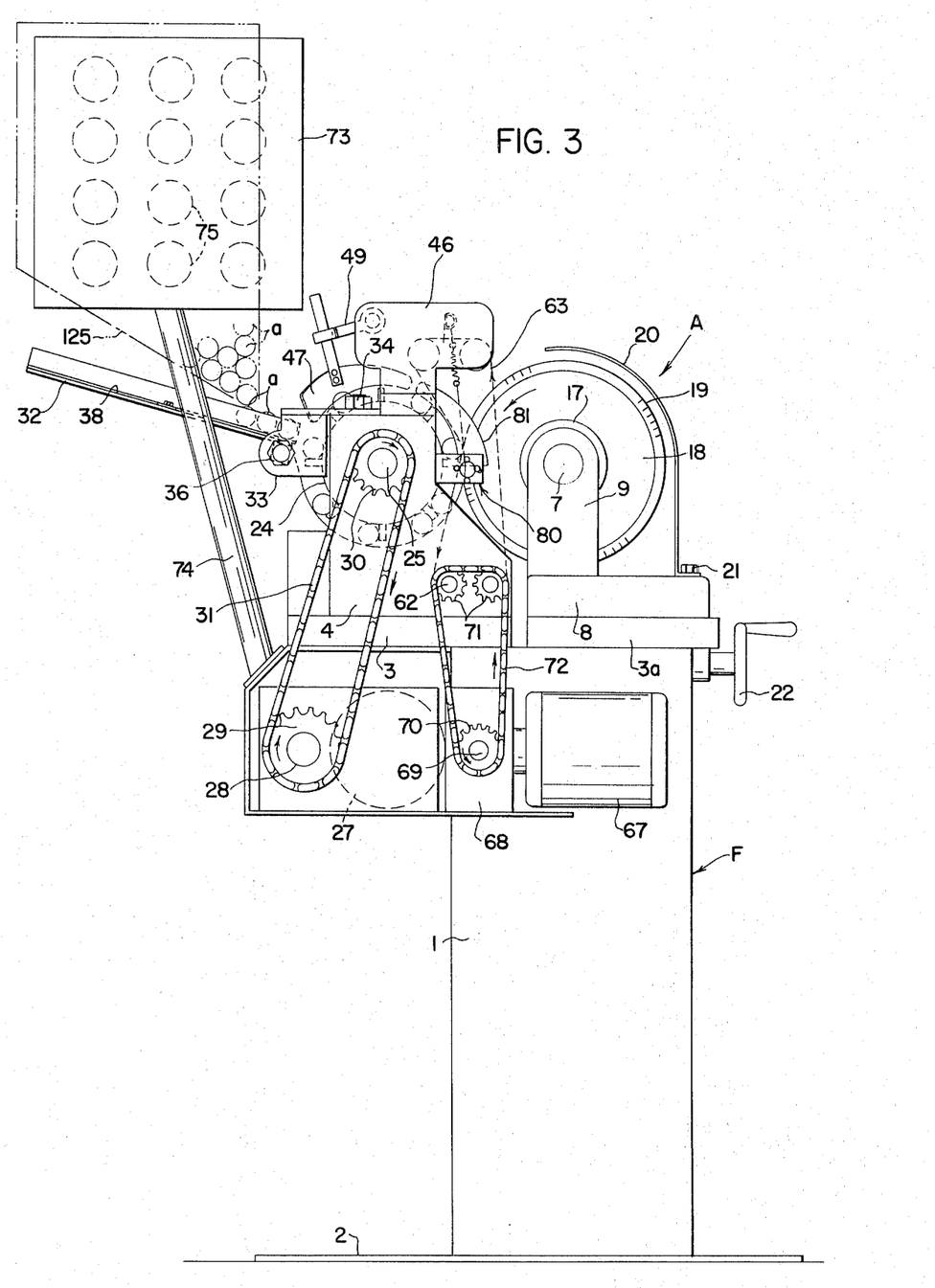
FIG. 3 is an end elevational view of the machine with parts omitted, an optional hopper being shown in broken lines.

Referring more particularly to the drawings in which like parts are identified by the same numerals throughout the several views, FIGS. 1–3 show external views of a tube cutting machine A constructed according to the present invention having a rigid frame F including an upright generally rectangular portion 1 mounted on a flat horizontal base plate 2 adapted to be bolted to the floor. The frame also has a horizontal portion 3 overhanging the upright portion 1 and supporting a pair of upright end portions 4. A drum assembly 5 is mounted between the portions 4, and a rotary cutter assembly 6 is mounted on the frame at one side of the drum assembly. The cutter assembly includes a main cylindrical spindle 7 rotatably mounted in a horizontal position parallel to the drum shaft 25. The main spindle is supported above a horizontal slide 8 between a pair of upright end portions 9 carried by the slide. The slide is mounted in a horizontal position on the horizontal portion 3a of the frame and is guided for sliding movement toward and away from the drum assembly.

The spindle 7 is driven by means of a drive assembly 11 which includes an electric drive motor 12 having a drive shaft 13 arranged to drive an endless drive belt 14 by means of a lower pulley wheel 15 mounted on the shaft 13 and an upper pulley wheel 16 mounted on the spindle 7 and arranged to drive the spindle.

A series of externally cylindrical spacer collars 17 are slidably mounted on the cylindrical spindle 7 to provide means for holding one or more rotary knives 18. Each spacer collar is in the form of a solid metal cylinder of a predetermined axial length having an internal diameter corresponding substantially to the external diameter of the spindle. These collars may be arranged end-to-end so as to extend the full length of the spindle and they may be arranged to receive a series of rotary knives 18. Each knife is essentially a flat circular disc with a hollow ground peripheral portion which is preferably slotted to provide a series of regularly spaced teeth 19 of generally rectangular or trapezoidal shape. The teeth 19 are not essential and may be omitted because the disc 18 functions as a knife to separate material rather than to cut away material from tubes $a$. Each knife 18 is attached to fit on the spindle 7 and is attached to the spindle for rotation therewith by being clamped tightly between a pair of collars 17.

A curved sheet metal protective shield 20 is mounted on the slide 8 by means of a series of screws 21. The shield preferably extends the full length of the spindle as indicated in FIG. 1.

Conventional means are provided for adjusting the position of the slide 8 relative to the drum assembly 5. As herein shown, a pair of rotatable adjusting handles 22 are provided to effect such movement in a horizontal direction perpendicular to the drum shaft 25.

The drum assembly 5 includes a cylindrical metal drum 24 which extends axially a distance several times its diameter as shown in FIGS. 1 and 2. The drawings herein are drawn substantially to scale to facilitate an understanding of the invention, but it will be understood that the sizes of the parts, particularly the thicknesses, may be varied substantially.

The drum 24 is mounted for rotation about a horizontal axia parallel to the axis of the spindle 7. Any conventional means may be employed to effect such mounting, and it will be understood that it is not necessary to employ a shaft for the drum extending the full length of the drum. However, for convenience of illustration, the drum 24 is provided as shown with a shaft 25 which is journaled in the frame at opposite ends of the shaft.

The drum 24 is provided with a series of regularly spaced flat radial vanes 26 of rectangular cross section which extend axially the full length of the drum parallel to the axis of rotation. The vanes 26 are rigidly mounted in fixed position around the drum so that all of the vanes project radially the same distance from the periphery of the drum. It will be understood that such vanes may be constructed for radial adjustment so as to accommodate tubes of widely varying diameter, but this is not essential.

The drive means for the drum assembly 5 includes an electric drive motor 27 and a drive shaft 28 driven by the motor and rigidly connected to a drive sprocket 20. An upper sprocket 30 is rigidly connected to the drum shaft 25 to receive an endless drive chain 31 which is carried by the sprocket 29. The chains and sprockets are preferably covered by a protective shield or cover (not shown).

Means may be provided for feeding a series of tubes $a$ one at a time to the drum assembly 5. Such means may, if desired, be provided with conventional escapement mechanisms to feed the tubes one at a time and to prevent cascading, but this is not essential where the vanes 26 are closely spaced.

Figure 4:
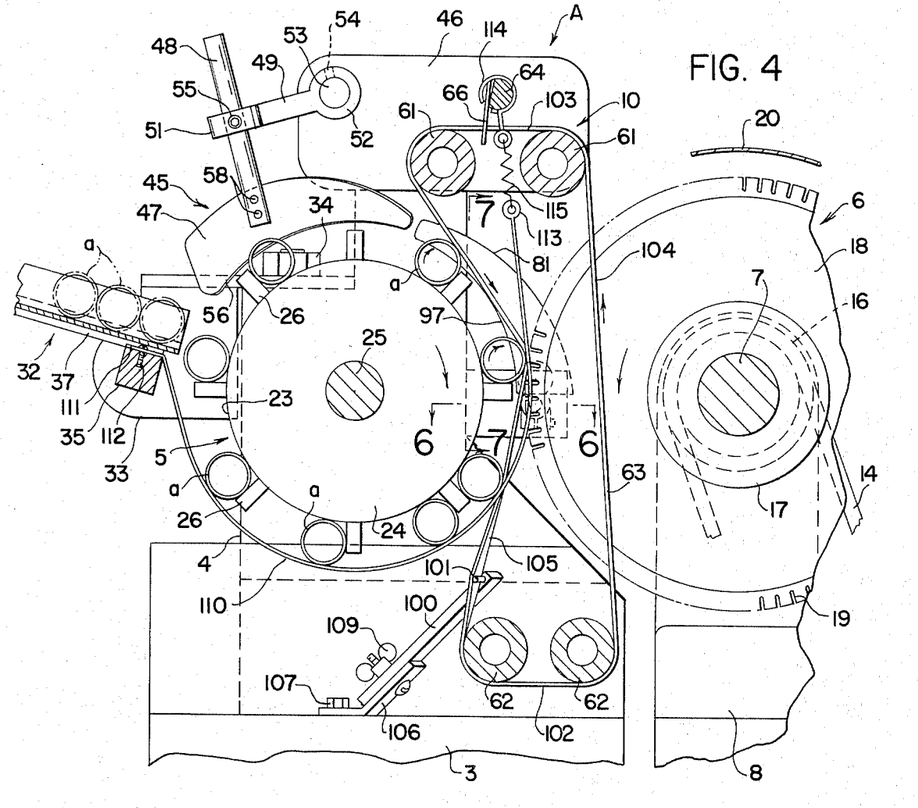
FIG. 4 is a fragmentary vertical sectional view of the machine on a larger scale.

As herein shown, the feed means for the drum assembly includes an inclined feed table 32 mounted on a pair of rigid mounting brackets 33 which are detachably connected to the upright frame portions 4 by screws or mounting nuts 34 or the like. A horizontal bar 35 of square cross section extends between the brackets 33 and is mounted thereon by mounting nuts 36 or other fastening means. A plurality of metal strips 37 are rigidly mounted on the bar 35 in an inclined position as shown in FIG. 4 to provide supports for a flat rectangular masonite board 38 which forms the tube receiving table. One or more adjustable guide means 39 are provided on the upper surface of the board 38 to engage the ends of the tubes $a$ and to guide them as they roll toward the drum. Where the tubes $a$ have a length greater than half the length of the drum, only one such guide means 39 is needed, and a row of tubes $a$ may be placed on the table 32 with the tubes in parallel positions engaging the guide means 39. Where it is desired to speed up the rate of production when cutting extremely short lengths of tubing, a second guide means 39 may be employed as shown in FIGS. 1 and 2, but this is optional. When a second guide means is used, an optional dividing bar 44 may be mounted on the central portion of the feed table as indicated in FIGS. 1 and 2.

As herein shown, each of the guide means 39 comprises a straight metal angle 40 welded to a flat lateral bar 41 having an elongated slot 42. The guide means is rigidly held in its adjusted position by a locking screw 43 which extends through the slot into the feed table.

Adjustable guide means 45 are preferably provided in addition to the guide means 39 to guide the tubes $a$ after they have moved on to the drum. Each guide means 45 is rigidly supported in its adjusted position on an upwardly extending supporting member 46 which is rigidly mounted on each upright frame portion 4. Each guide means comprises a short metal guide member 47 of special shape (see FIG. 4) which is rigidly mounted on the bifurcated end of a rod 48 by means of a pair of rivets 58. A supporting arm 49 is provided having an internally cylindrical eye 51 which fits on the rod 48 and having a similar eye 52 which fits on a horizontal stub shaft 53 carried by the adjacent member 46. The arm 49 is held against movement relative to the stub shaft by a conventional set screw 54 in the eye 52 and is rigidly connected to the rod 48 by a similar set screw 55 in the eye 51.

The guide member 47 is preferably substantially flat and is preferably provided with a circular edge surface 56, which may be located concentric to the drum and near the outermost surface of the radial vane 26 as shown in FIG. 4. The member 47 preferably extends circumferentially a substantial distance such as 60 to 90 degrees and may be tapered generally as shown in the drawings so as to terminate in a round nose 57. As herein shown, two guide means 45 are provided in connection with two guide means 39, but it will be understood that the second guide means is optional and is preferably omitted when the machine is operated in the normal manner with a series of knives 18 arranged for multiple cuts.

The tube cutting machine A is provided with an endless belt assembly 10 to effect rotation of the tubes $a$ during the cutting operation. The assembly 10 includes a pair of upper cylindrical roller shafts 61 located in spaced parallel relation and mounted for rotation on the members 46 about horizontal axes parallel to the shafts 7 and 25. A pair of similar polished external roller shafts 62 are mounted for rotation in a similar manner about parallel horizontal axes. A series of endless rubber bands 63 are mounted on the hollow shafts 61 and 62 as indicated in FIG. 4. A horizontal rod 64 of semi-circular cross section extends between the rigid supporting members 46 and is rigidly mounted thereon. The rod has a flat surface 65 on one side thereof and has a cross section to receive a series of P-shaped band guides 66. Each band guide expands slightly to receive the rod 64 and tightly grips the rod so that it resists axial movement and will remain in the desired adjusted position. The upright straight portion of each band guide 66 extends downwardly below the horizontal portion of the endless band 63 which overlies the shaft 61 so as to prevent axial movement of the band relative to the shaft 61. A pair of band guides 66 are spaced apart a distance slightly greater than the width of the band 63 so as to locate the band. This is all that is needed to maintain the band so that it operates substantially in a vertical plane. It will be understood, however, that additional band guides may be employed if desired.

The drive means for the belt assembly 10 includes an electric drive motor 67, a gear reduction box 68 having a drive shaft 69 powered by the motor, and a drive sprocket 70 rigidly mounted on the shaft 69. A pair of upper sprockets 71 are rigidly mounted on the ends of two roller shafts and receive the endless drive chain 72 which is driven by the sprocket 70. The chain and sprockets are preferably covered by a conventional protective shield or cover (not shown).

A generally rectangular control panel 73 is mounted on the machine and supported by an inclined pipe 74 carried by the frame which receives the electrical wiring. The control panel has three rows of buttons and a pair of lights 75. The light may indicate when the drive motors are on or are ready to operate. A stop and a start button is preferably provided for each of the electric drive motors 12, 27 and 67, and additional control buttons may be provided, if desired, for jogging, changing speed, or stopping all motors simultaneously.

The equipment described above can be used to carry out the conventional tube cutting process wherein a substantial number of rotary knives 18 are mounted on the spindle to cut each long tube a into a series of sections with a length several times the diameter. In performing such conventional process, the divider bar 44 is omitted, each long bar a preferably extends substantially the full length of the drum, and a series of endless bands 63 are preferably mounted on the roller shafts 61 and 62 in regularly spaced rotation to effect rotation of the tubes a during cutting. The spacing may, for example, be generally as indicated in FIGS. 1 and 2.

The conventional process may be unsatisfactory, however, when cutting the tube a to extremely short lengths, particularly where the axial length is less than the diameter. It may also be unreliable for cutting thick-walled tubing with a length less than twice the diameter. The problem may sometimes be partially solved by using wider bands 63 for better support during cutting or by using mandrels, but the bands can be no wider than the pieces to be cut and mandrels radically reduce the rate of production.

The present invention involves an improvement in the tube cutting apparatus which makes an automatic or semi-automatic machine of the type described above suitable for the conventional multi-cut process and also suitable for mass production cutting of extremely short lengths (for example, a length which is only a fraction of the external diameter). The additional equipment needed to provide this versatility in accordance with the invention claimed herein is relatively simple and inexpensive and is described in more detail below. This includes an adjustable stop means 80 and feeding means for advancing the tubes a against the stop in response to rotation og the tubes and/or rotation of the drum 24. A guide means similar to guide means 45 or an extension of the latter may also be provided, if desired.

The top means may be of any suitable construction and preferably includes a flat stop member 81 perpendicular to the drum axis which extends a substantial distance (e.g., 20 to 60 degrees or more) around the circumference of the drum. As herein shown, the stop means 80 includes a stop member 81 having a shape somewhat similar to that of the guide plate 47, and means for holding the stop member in axially adjusted positions. The stop means includes an elongated block 82 rigidly mounted on the upright portion 4 of the frame by bolts 83 and having a cylindrical bore 84 which receives a sliding metal rod or cylinder 85. The end of the bore is closed by an end cap 86 which is internally threaded to receive an adjusting screw 87 which engages the end of cylinder 85. A handle 88 is provided on the end of the screw and a similar handle or locking nut 89 is provided on the screw to lock it in its adjusted position. A pin 76 extends through the cylinder 85 to prevent rotation thereof and engages a helical compressing spring 77 in the pin-receiving slot 98, whereby the cylinder is held against the screw 87 by spring pressure.

One end portion of the cylinder 85 projects from the block 82 and has a cylindrical bore 91 to receive a removable horizontal rod 92. The end portion is split and provided with flanges 93 that receive a lock bolt 94 whereby the cylinder may be clamped in the desired position on the rod 92 by tightening the bolt. The rod is welded to a collar 95 similar to collar 78 which also fits on the pin 79. The collars 78 and 95 are rigidly held in adjusted positions on the pin by set screws 96. The stop member 81 may be adjusted radially relative to the drum by changing the angular position of the rod 92 and collar 95 relative to cylinder 85 and collar 78. Thus, the stop means 80 provides radial as well as axial adjustment. The stop means has an arcuate edge surface 97 located near but out of the path of movement of the vanes 26. The surface 97 may be positioned concentric to the drum by proper adjustment and may extend a substantial distance (e.g., 20 to 80 degrees) around the circumference of the drum. As herein shown, the stop member is similar to guide member 47 and extends about 70 degrees or so from a position near the plane containing the axes of the drum shaft 25 and the spindle 7 to a position near the end portion 57 of the guide 47.

The tubes a may easily be fed axially against the stop member 81 in response to rotation of the endless belt assembly and the tubes a. This is preferably accomplished by applying pressure to one or more of the endless bands 63 or otherwise causing them to be skewed slightly in a direction to effect axial movement of the tubes a. As shown in FIG. 4, such skewing is effected by an adjustable arm 100 having a pin 101 projecting therefrom and engaging the adjacent band 63. The pin deflects the bowed portion 105 of the band to maintain the lower horizontal portion 102 of the band below rollers 62 a fraction of an inch (for example, one-eighth to one-half inch) out of vertical alignment with the upper horizontal portion 103 of the band. The position of the latter portion is determined by the two band guides 66 at opposite sides of portion 103. The skewing of the deflected band portion 105 also results in deflection of the straight upright portion 104 of the band but to a lesser degree As herein shown, only the outermost band 63 is skewed, but it will be apparent that two or more of even all of the bands 63 will be skewed in a similar manner using arms 100 or other suitable means to defect the band portions 105. Where the outer band 63 is only skewed and the remaining bands are straight, the latter bands resist the axial movement of the tubes a somewhat but ordinarily not enough to materially affect the operation of the machine, particularly when relatively narrow bands are used.

As herein shown, each arm 100 is adjustably mounted in an inclined position by a bracket 106 which is rigidly connected to the frame portion 3 by a screw 107. The arm is connected to the inclined portion of the bracket by an adjusting screw 108 which is tightened by a wing nut 109 to clamp the arm rigidly in the desired adjusted position with the pin 101 engaging the belt 63 generally as indicated in FIG. 4, for example.

Ordinarily the machine A requires only one arm 100 and one rotary cutter 18 (omitting center guide 44), but faster operation can be effected by the arrangement illustrated in the drawings wherein a second cutter 18 is employed and an optional second arm 100 is provided which is located mirror-symmetrically relative to the first arm 100 to skew its associated belt 63 in the opposite direction to effect axial feeding of the tubes toward the optional second stop 81 (see FIGS. 1 and 2).

Means are provided for holding the tubes $a$ on the drum 24 after they move out of contact with the belts 63 so that they will be returned to the knife 18 for subsequent cuts. Such means may be of various types and may be mounted on and rotatable with the drum as in the modified form of FIGS. 8 to 10. Such means preferably comprise a plurality of removable sheet metal straps 110 or the like bent around the drum to prevent the tubes $a$ from falling off the drum. The straps have smooth surfaces so they do not interfere with rotation of the tubes $a$.

As herein shown, each strap 110 is a smooth metal strip of uniform width and thickness having a flat fixed end 111 connected by screws 112 to the bar 35 of the feed table and having an eye 113 at its upper end detachably connected to the bar 64 by a ook 114 and a helical tension spring 115. At least one and preferably a series of straps 110 are employed as shown in FIGS. 1 and 2, for example.

When it is desired to adjust the machine A of FIGS. 1 to 7 for cutting of the tubes $a$ into sections having lengths of several inches or many times the diameter of the tube, the straps 110 are removed and a series of rotary knives or cutters 18 are mounted on the spindle 7, each knife being spaced axially from the next knife by the collars 17 a distance equal to the desired length of the cut tube. The dividing bar 44 is then omitted, and each tube $a$ fed from the table 32 to the drum assembly 5 preferably extends substantially the full length of the drum. The vanes 26 are adjusted radially to project from the peripheral surface 23 of the drum a distance greater than the radius and less than the diameter of each tube $a$.

With the equipment adjustment for multiple cutting as described above, each tube $a$ is placed on the feed table 32 parallel to the axis of the drum 24 in a single row and moves toward the drum as the other tubes in a row are fed one at a time to the drum. The vane 26 lifts the lowermost tube $a$ from the row at table 32 and advances it around the drum toward the rotary knives. With equipment of the type illustrated herein, the vanes can escape the tubes $a$ one at a time from the feed table to the drum without separate escapement means. It will be understood, however, that conventional escapement means can be employed at the discharge end of the table 32 as is well understood in the art.

As shown in FIG. 4, the axis of each tube $a$ moves with the drum more than 90 degrees in a clockwise direction from the discharge end of the table 32 before the tube engages the endless bands 63 and then moves at least 30 degrees more while the tube is in contact with the bands before the tube engages the knives 18. The bands 63 cause the tube $a$ to rotate at an angular speed many times that of the drum 24 so that the tube makes at least one complete revolution while in contact with the knives 18, whereby severing is effected before the tube moves out of contact with the knives. Each of the severed tube sections engages one of the rubber bands 63 and is held on the drum until it moves out of contact with the band. With the straps 110 removed, these tube sections are free to fall and are preferably caught in a conventional chute (not shown) located below the drum.

In the machine shown in the drawings, each band 63 has a deflected portion 105 which remains in contact with a tube $a$ on the drum 24 while the drum turns about one-quarter revolution and which causes the tube to rotate several times during such contact. It will be apparent, however, that the amount of contact and the speed of movement of the band 63 relative to the drum 24 may be varied considerably.

Figure 5:
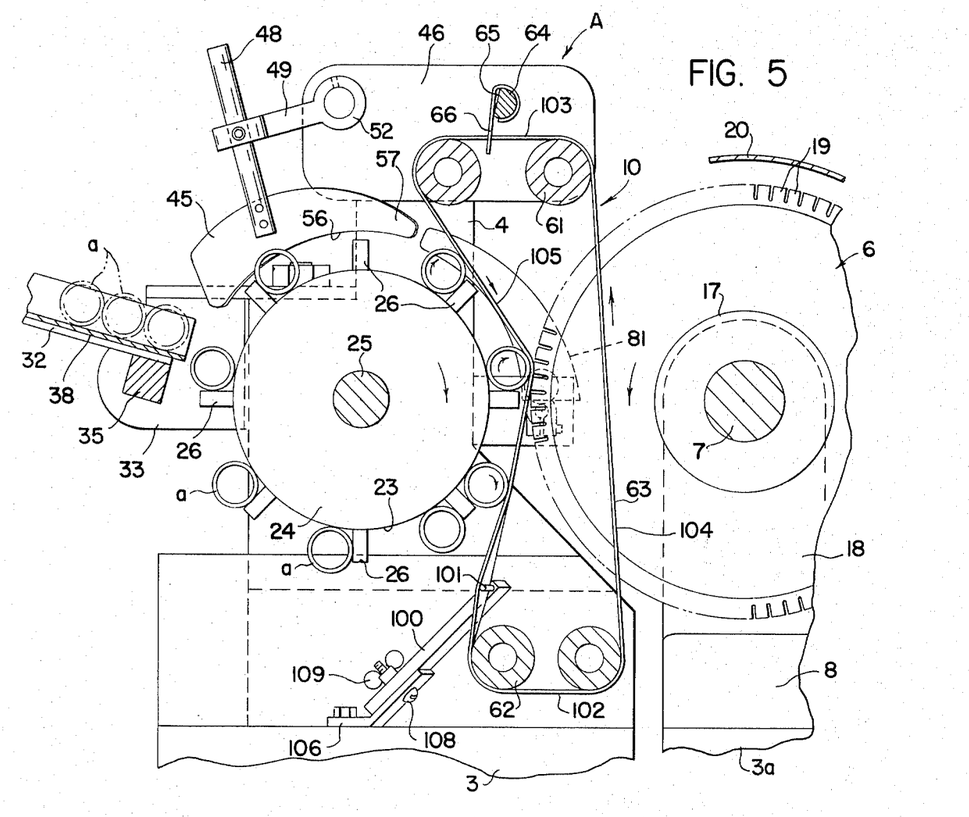
FIG. 5 is a fragmentary vertical sectional view on the same scale as FIG. 4.

The rotary knives 18 are adjusted horizontally toward or away from the drum by turning the handwheels 22 to move the slide 8 in or out. In order to cut off the tube sections it is necessary to position the spindle 7 so that the peripheral edge of each knife projects to or beyond the internal surface of the tube. When adjusted as shown in FIG. 5, for example, the peripheral edge of each rotary knife 18 is spaced from the peripheral surface 23 of the drum a radial distance which may be greater than the internal diameter of the tube $a$ and is preferably slightly less than said internal diameter plus the wall thickness of the tube. Such radial distance may be less than the internal diameter of the tube $a$ so that the cutting portion 19 of the knife projects a substantial distance through the tube wall, but better cutting may usually be obtained when such projection is minimized. The knife should not engage the vanes 26, and the vanes are preferably adjusted to avoid contact with the knife or contact with the bands 63. However, the vanes can be provided with slots to receive the knife when the tubes $a$ have a very small diameter.

The conventional multiple-cutting operation is usually satisfactory so long as the tube sections being cut have a length at least several tims the tube diameter. Where the cut sections are short, it is often desirable to provide soft rubber bands 63 with a substantial width, such as 1 to 3 times the tube diameter, to provide better support during cutting, but such width must be less than the length of the cut. Wide bands 63 are not needed, however, when the cut sections are relatively long. The normal width of each band 63 is about one-quarter inch.

When the sections to be cut from tube $a$ have a length substantially less than twice the external diameter of the tube or less than such diameter, the conventional multiple-cutting operation described above may not be feasible. In that case the machine A is adjusted for use with the straps 110, at least one arm 100 to hold one of the belts in a skewed position, and at least one stop 81 so that one piece is cut off the end of each tube $a$ during each revolution of the drum 24.

The machine A may be operated with one knife 18 to cut at one end only when using one arm 100 and one skewed belt or using belts skewed in only one direction so that the second stop 81 and the second guide means 39 are not needed and may be omitted. In such case the divider 44 is preferably omitted to permit use of tubes *a* with a length substantially greater than half the length of the drum.

Higher speed operation is possible when operating the machine A with two rotary knives 18 as illustrated, for example, in FIG. 1 of the drawings. Although this is not necessarily the preferred method, the operation of the machine in this manner will be described below, it being readily apparent how the machine may be operated with one knife only instead of two.

In the embodiment of the invention illustrated in FIGS. 1 to 7, a substantial number of tubes *a* with a length somewhat less than half the axial length of the drum 24 are placed in rows on the inclined table 32 with their ends near the guides 39. The tubes are allowed to roll toward the rotating drum 24 where they are picked up by the vanes 26 one at a time. Each tube *a* engages the drum and is lifted and advanced toward the rotary cutter unit 6. As it advances the end of the tube can engage the guide 47 to move the tube a short distance axially in response to rotation of the drum.

When the tube moves beyond the guide 47 into engagement with the endless elastic rubber bands 63, it is caused to rotate and forced against the smooth surface of the associated vane 26 as indicated in FIG. 5. The outermost band 63 is skewed by the pin 101 which holds the lower portion 102 of the band a fraction of an inch (for example, 0.2 to 0.3 inch) out of vertical alignment with the upper portion 103, which is held by the guides 66. The skewed band engages the tube *a* and advances it axially against the stop 81 before the tube engages the knife 18. The axial feeding by the skewed band is very effective and will position the tubes *a* properly against the stop even when the ends of the tube on the table 32 are out of alignment by a substantial amount (for example, 1 inch to 1.5 inches or so). It is, therefore, possible to operate efficiently even without the guides 47.

As the rotating tube *a* continues to move downwardly with the drum toward the line of centers of the drum and the spindle 7, it engages the rotating knife 18 which effects cutting by material displacement. This is not a sawing operation and there is little removal of material, although some dust may be produced during the cutting. The cutting portion 19 of the knife is preferably slotted to provide teeth but this is not essential. It will be understood, however, that the knives 18 may be replaced with saws for special jobs.

The knife 18 is preferably located so that it projects past the inner space of the tube being cut only a very short distance, such as 0.01 to 0.02 inch, to avoid forming a burr but it may project a greater distance, such as 0.05 to 0.06 inch, if the periphery of the tube *a* is uneven. It can project a much greater distance if a burr is considered desirable.

Figure 6:
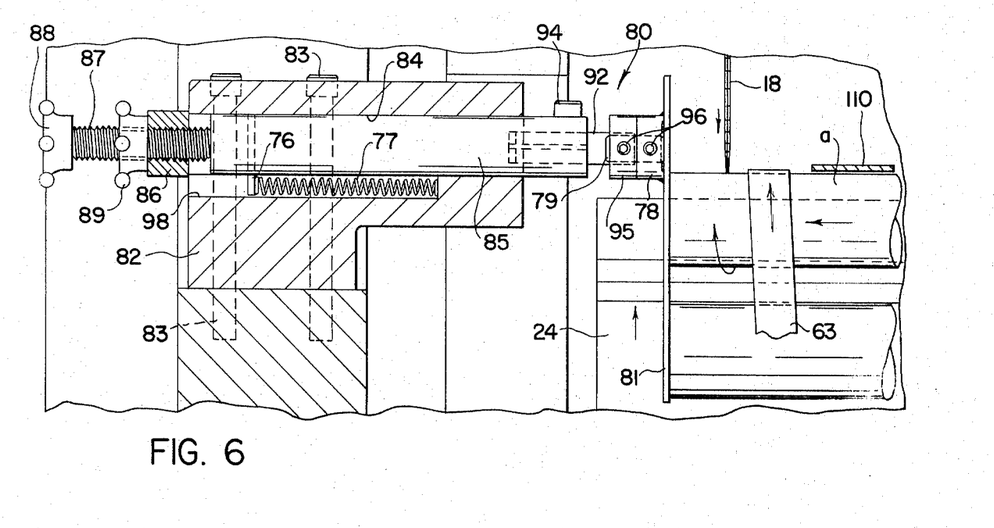
FIG. 6 is a fragmentary horizontal sectional view taken substantially on the line 6—6 of FIG. 4.
Figure 7:
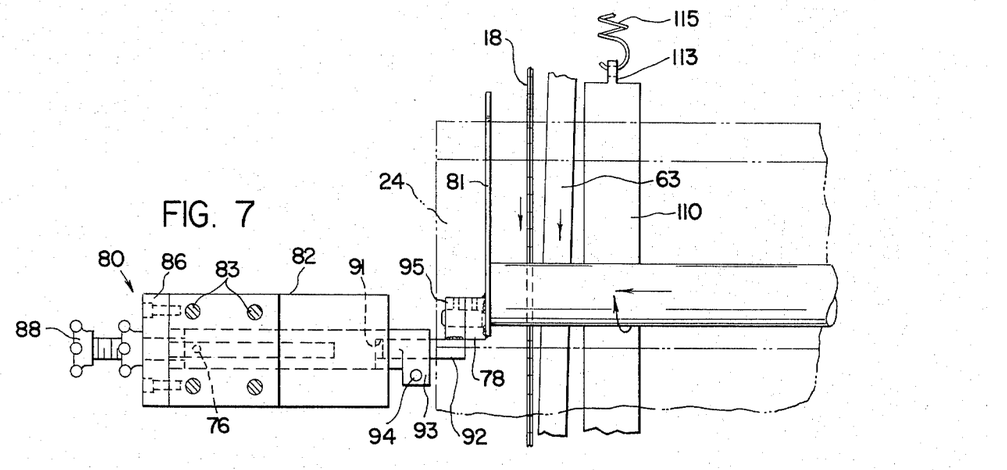
FIG. 7 is a fragmentary vertical sectional view taken substantially on the line 7—7 of FIG. 4.

The knife is spaced from the stop 81 a distance corresponding to the desired length of the pieces to be cut (see FIGS. 6 and 7). When cutting washers or the like, the knife may be a small fraction of an inch from the stop.

While the tube *a* is in contact with the knife, it is rotated at least one revolution by the bands 63. Therefore, the tube is cut all the way around its circumference, and the washer or other piece between the knife and the stop 81 is severed before the tube moves out of contact with the knife. The cut piece is allowed to fall and may be caught in a suitable receptacle or chute below the drum.

After the piece is severed, the remainder of the tube *a* is held against the drum by the smooth metal straps 110 so that it can be advanced 300 degrees or more around the drum by the vanes 26 for a subsequent cut. As it approaches and moves into engagement with the bands 63, its cut end may be spaced from the stop a substantial distance. The skewed band 63 moves it axially, however, so that the cut end engages the stop before the second cut begins.

The cutting is repeated once each revolution of the drum until only a short piece remains. In order to minimize waste, the outermost skewed band 63 is spaced a very short distance from the knife (for example, one-quarter to one-half inch or less) and the outermost strap 110 is likewise close to the skewed band as shown, for example, in FIGS. 6 and 7 (for example, within one inch of the knife). With this arrangement the skewed band 63 can effect the desired rotation during cutting even when the remaining tube is very short. Eventually the remaining tube is too short to be held by the straps 110 and will fall off the drum as waste.

The stop 81 preferably terminates near the line of centers of the spindle 7 and the drum shaft 25 so that the severed piece can fall freely when the cutting is completed. This also allows the skewed belt to move the remainder of the tube a short distance axially toward the stop during the short movement (for example, 20 to 25 degrees) in the brief period from the time the tube passes the stop until it moves downwardly out of engagement with the belts 63.

The above description applies to the operation at each end of the drum 24 when left- and right-hand stops 81 and oppositely skewed belts 63 are employed as in the species of FIGS. 1 and 2.

It is preferable to load the drum with the proper number of tubes *a* so that the feed table 32 is empty during the cutting operation. However, conventional escapement means may be provided for holding the tubes on the table during cutting if fully automatic operation is desired. Likewise, a hopper 125 may be provided to maintain a supply of tubes as indicated in dot-dash lines in FIG. 3.

It will also be understood that the tubes *a* may be fed to the tube cutting machine of this invention by a conventional bar feeder having a conventional automatically controlled escapement mechanism at the end of the feed ramp. Such bar feeders and escapement mechanisms are disclosed, for example, in U.S. Pat. Nos. 3,480,159; 3,493,125; 3,506,142 and 3,581,879.

Figures 8, 11:
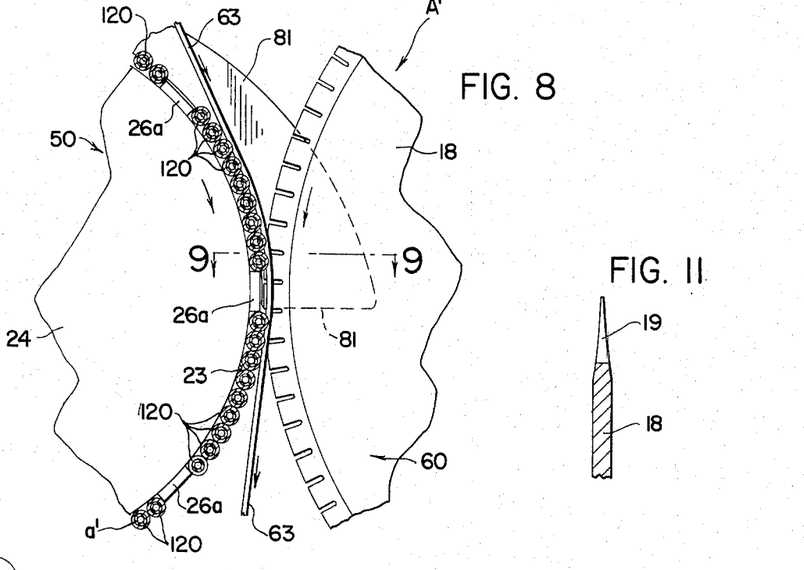
FIG. 8 is a fragmentary vertical sectional view showing a modified form of the invention.
FIG. 11 is a fragmentary cross sectional view showing a portion of the rotary knife.
Figure 9:
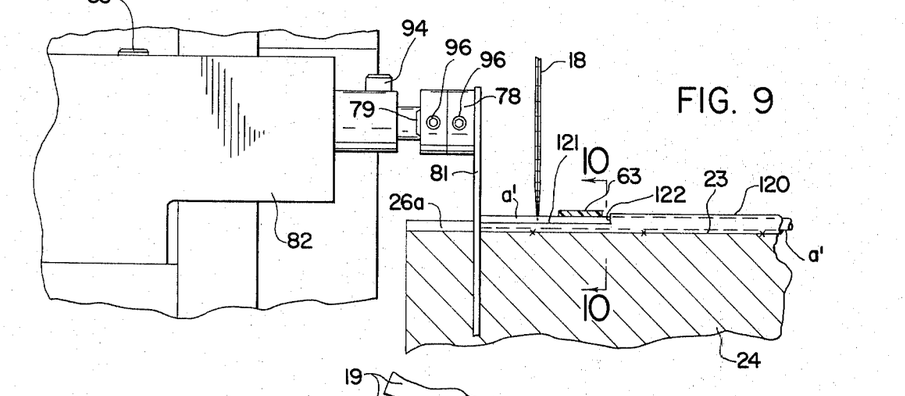
FIG. 9 is a fragmentary horizontal sectional view taken substantially on the line 9—9 of FIG. 8.
Figure 10:
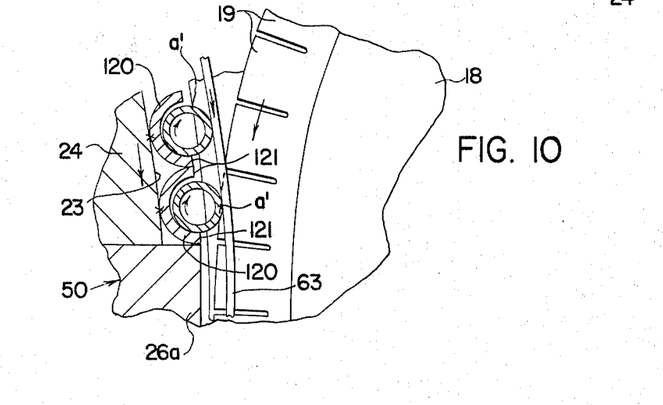
FIG. 10 is a fragmentary vertical sectional view taken substantially on the line 10—10 of FIG. 9 and on a larger scale.

FIGS. 8 to 10 show a modified form of tube cutting machine A', which may be the same as the machine A except that the straps 110 are removed and a series of metal tubes 120 are welded to or otherwise rigidly mounted on the drum 24. Any number of tubes 120 may be mounted on the drum, preferably a substantial number as indicated in FIG. 8, for example. Only one arm 100 and one skewed belt 63 is used in this embodiment so that the tube *a'* extends the full length of the tube 120, but it will be understood that two arms 100 and two skewed belts may be used if shorter tubes *a'* are used and loaded into both ends of each tube 120.

Each tube 120 has one or more and preferably a series of slots therein to receive the rotary knives 18 and the belts 63 during the end-cutting operation or the more frequent multiple-cut operation. As herein shown, each tube has at least one slotted portion 121 for this purpose which terminates in a shoulder 122 a short distance beyond the belt 63 (see FIG. 9). The numer of slots in the metal tube 120 corresponds to the number of belts and would be six in a machine of the type shown in FIGS. 1 and 2.

Long tubes a' of small diameter made of paper or synthetic plastic material are slid into the metal tubes 120 by a manual loading process while the drum is slowly indexed. This is a slow procedure but makes it possible to cut stringlike rods or tubes of extremely small diameter which could not otherwise be cut on the machine. For example, it may be possible to cut tubes with a diameter of 0.01 inch and a wall thickness of around 0.002 inch to short lengths such as 0.1 to 0.2 inch.

The size of the metal tubes 120 depends on the size of the tubing to be cut. Usually the internal diameter of tube 120 will be about 0.1 inch to 0.2 inch. The slot at 121 preferably has a radial depth at least 0.4 times the outside diameter or sufficient to permit proper driving of the tube a' by the belt 63 and cutting of the tube without damage to the knife 18. If desired, narrow notches may be provided in the tube 120 to receive the knife. However, this is not necessary where each knife 18 is positioned adjacent one of the belts 63.

In the arrangement shown in FIG. 9, a skewed belt 63 is located near the stop 81. It will be understood, however, that the stop may be omitted and the arm for belt 63 also omitted when performing a multiple-cutting operation with a series of knives 18.

The rods or tubes a and a' are usually made of a material which is easily cut by a knife such as paper, cardboard, plastic, rubber or the like, but it will be understood that the process of this invention may be applied to the cutting of harder materials, including metals, and to the cutting of solid rods.

It will be understood that, in accordance with the provisions of the patent laws, variations and modifications of the specific methods and devices disclosed herein may be made without departing from the spirit of the invention.

Having described my invention, I claim:

1. A machine for mass-producing both medium and short lengths of tubing from long tubes without use of mandrels to support the tubes comprising a rotary drum having at least eight radial vanes spaced apart to receive loosely a multiplicity of long empty tubes (a), a spindle parallel to said drum for supporting a series of flat rotary knives, said spindle having at least four cylindrical collars mounted thereon in end-to-end relation and adapted to clamp one of said knives between each pair of said collars for multiple-cutting operations, a series of endless band driving means spaced axially along the length of said drum, each driving means comprising a pair of spaced rollers above said drum, a pair of spaced rollers below said drum, an endless belt extending around said rollers and having a deflected portion extending between the upper and lower rollers for engaging the periphery of each tube to rotate the same during cutting, and means for driving at least one of said rollers to rotate the belt, an adjustable stop near the end of said drum for engaging the end of each tube during the cutting of that tube, removable means for holding the empty tubes on the drum as they move under the drum, one endless belt engaging the periphery of the tube within one inch of said stop, means for engaging said one belt to deflect it axially and to skew the belt in a direction to cause each empty tube to be advanced axially toward said stop in response to rotation of the tube, one rotary knife being located axially between said stop and said one belt and adjacent said belt, said knife projecting part-way into the tube during the cutting operation, said stop having an adjusted position spaced axially from said rotary knife a distance less than twice the diameter of the tube, whereby the same machine can be used with one rotary knife near said stop for mass production cutting of very short lengths of tubing and can be used with a series of rotary knives for multiple cutting of longer lengths of tubing.

2. A mass-production tube-cutting machine according to claim 1 wherein means are provided for feeding the tubes laterally to the drum including an inclined feed table at one side of the drum.

3. A machine according to claim 2 wherein said removable means comprises a series of axially spaced strips under the drum for engaging the tubes to hold them on the drum.

4. A machine according to claim 3 wherein said stop had an adjusted position spaced axially from said knife at a distance less than the radius of the tube.

5. A machine according to claim 2 wherein a stop, a rotary knife and a skewed endless belt are provided at each end of the drum so that a tube is advanced against a stop and cut by a rotary knife in the same way at each end of the drum.

6. Apparatus as defined in claim 1 wherein said drum has at least 30 long metal pipes mounted on the periphery of the drum to receive said tubes, each pipe having an opening therein to receive said rotary knife.

7. Apparatus as defined in claim 6 wherein each pipe has an internal diameter of about 0.1 to 0.2 inch and extends substantially the full length of said drum.

8. Apparatus as defined in claim 1 wherein said stop is spaced a short distance radially from the periphery of said drum, means are provided for holding the stop in fixed axially spaced adjusted positions along the length of the drum, and means are provided for adjusting the radial distance between said stop and said drum.

* * * * *